(12) United States Patent
d'Acoz et al.

(10) Patent No.: US 6,775,169 B1
(45) Date of Patent: Aug. 10, 2004

(54) CARD MEMORY APPARATUS

(75) Inventors: Xavier Guy Bernard d'Udekem d'Acoz, Waterloo (BE); Serge Alphonse Marcel Romain Delahaye, Carpentras (FR)

(73) Assignee: Xavier d'Udekem d'Acoz, Waterloo (BE)

( * ) Notice: Subject to any disclaimer, the term of this patent is extended or adjusted under 35 U.S.C. 154(b) by 0 days.

(21) Appl. No.: 10/018,074

(22) PCT Filed: May 31, 2000

(86) PCT No.: PCT/EP00/05017

§ 371 (c)(1),
(2), (4) Date: Mar. 12, 2002

(87) PCT Pub. No.: WO00/75881

PCT Pub. Date: Dec. 14, 2000

(30) Foreign Application Priority Data

Jun. 4, 1999 (EP) .......................................... 99870113

(51) Int. Cl.[7] ................................................. G11C 5/02
(52) U.S. Cl. ......................................... 365/52; 365/63
(58) Field of Search ........................... 365/52, 51, 63, 365/219, 220, 221

(56) References Cited

U.S. PATENT DOCUMENTS

| | | | |
|---|---|---|---|
| 3,972,028 A | | 7/1976 | Weber ...................... 340/172.5 |
| 4,566,082 A | | 1/1986 | Anderson .............. 365/230.03 |
| 4,958,322 A | * | 9/1990 | Kosugi et al. ................. 365/63 |
| 4,982,378 A | | 1/1991 | Matsushita ............. 365/189.01 |
| 5,274,788 A | * | 12/1993 | Koike .................... 365/230.03 |
| 5,287,527 A | * | 2/1994 | Delp et al. ............. 365/230.03 |
| 5,383,147 A | * | 1/1995 | Sanemitsu .................... 365/52 |
| 5,442,704 A | | 8/1995 | Holtey ........................ 711/163 |
| 5,473,573 A | * | 12/1995 | Rao ....................... 365/230.03 |
| 5,491,827 A | | 2/1996 | Holtey ........................ 711/163 |
| 5,517,630 A | * | 5/1996 | Tasaki ................... 365/230.03 |
| 5,671,367 A | * | 9/1997 | Le Roux ..................... 235/382 |
| 5,712,811 A | * | 1/1998 | Kim ............................. 365/63 |
| 5,883,842 A | * | 3/1999 | Miyauchi .................... 365/200 |
| 6,480,935 B1 | * | 11/2002 | Carper et al. ............... 235/380 |

FOREIGN PATENT DOCUMENTS

EP          0347321          12/1989

* cited by examiner

*Primary Examiner*—Tan T. Nguyen
(74) *Attorney, Agent, or Firm*—Jack V. Musgrove

(57) ABSTRACT

The present invention includes a card memory device (20) comprising a microprocessor (2), a plurality of memory units (5–12) for storage of digital data, the memory units (5–12) being embedded in the card memory device (20). A selecting device (3, 4) is provided for selecting one of the memory units (5–12) and for routing address information and data to the selected memory unit (5–12), both the microprocessor (2) and the selecting device (3, 4) being embedded in the card memory device (20). The card memory device integrates components into a thin flexible memory card with surface contacts (1) so that the components can cooperate as a compact unit providing environmental sealing and secure access to several Mbytes of digital data. A specially designed set (1) of contacts (21–25) are also described which reduce the risk of electrostatic discharge. The card memory device (20) may be used for secure control of a personal computer.

17 Claims, 15 Drawing Sheets

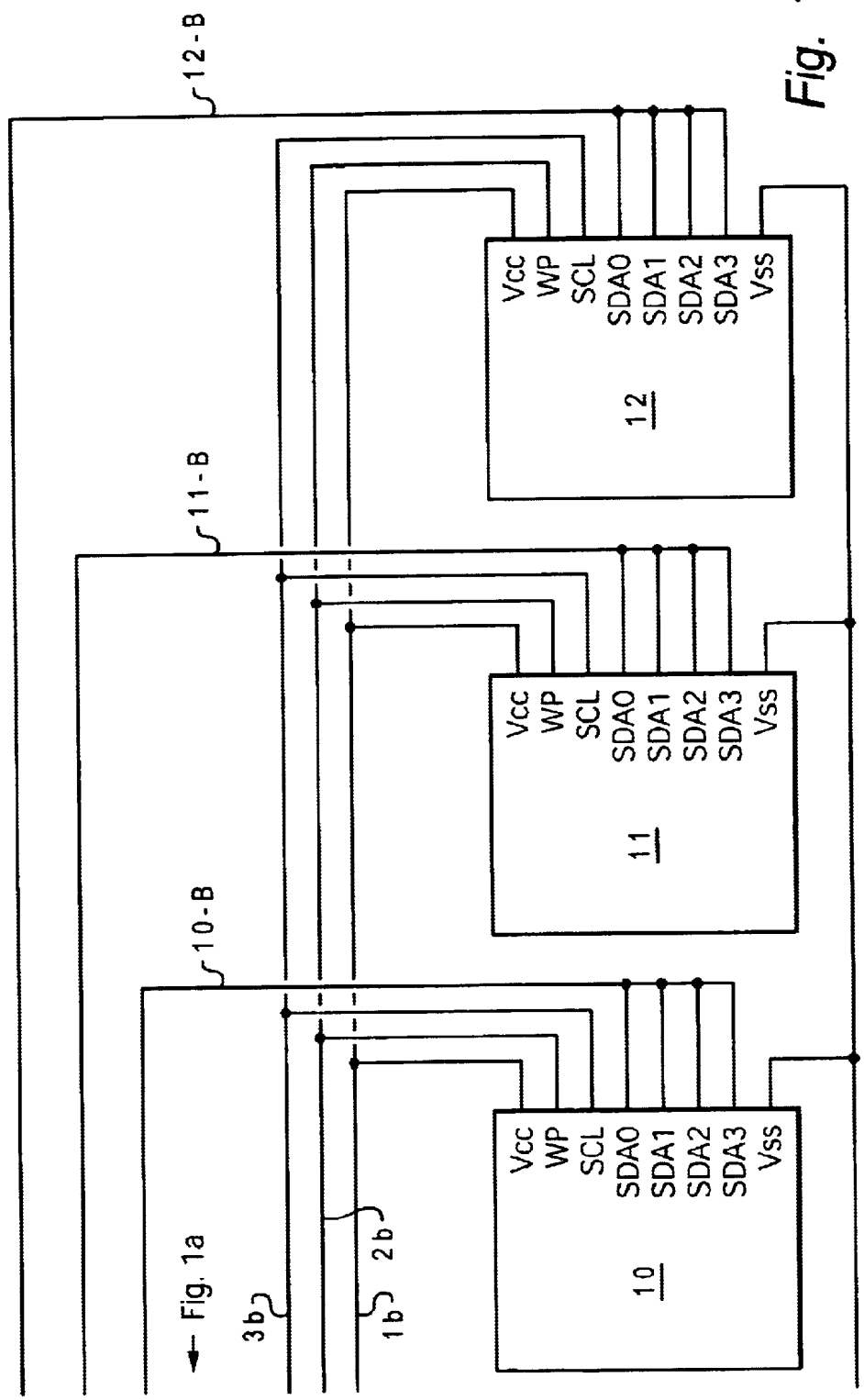

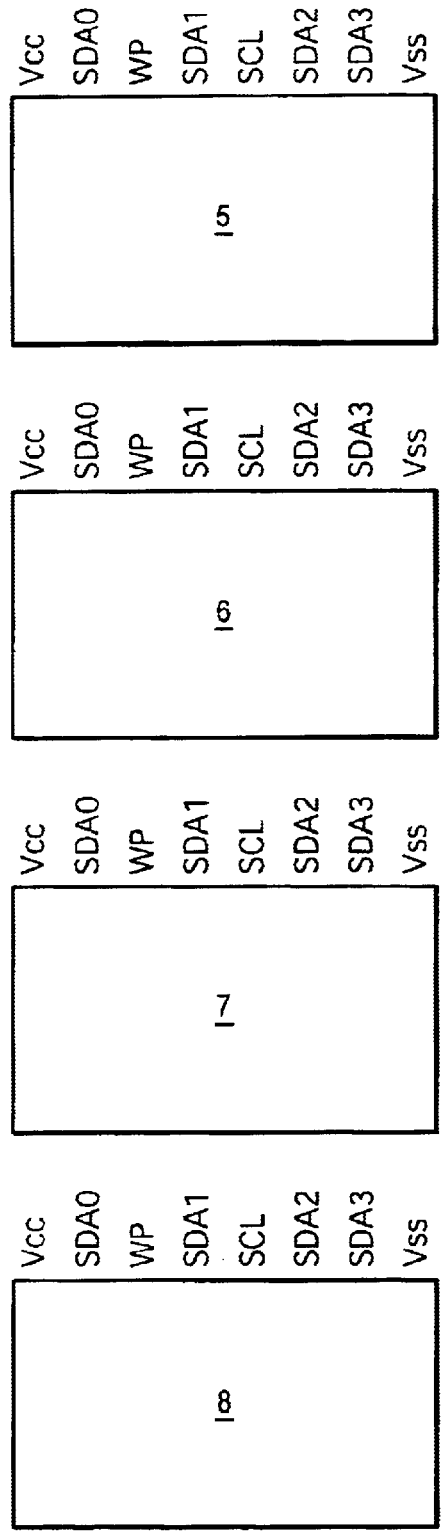
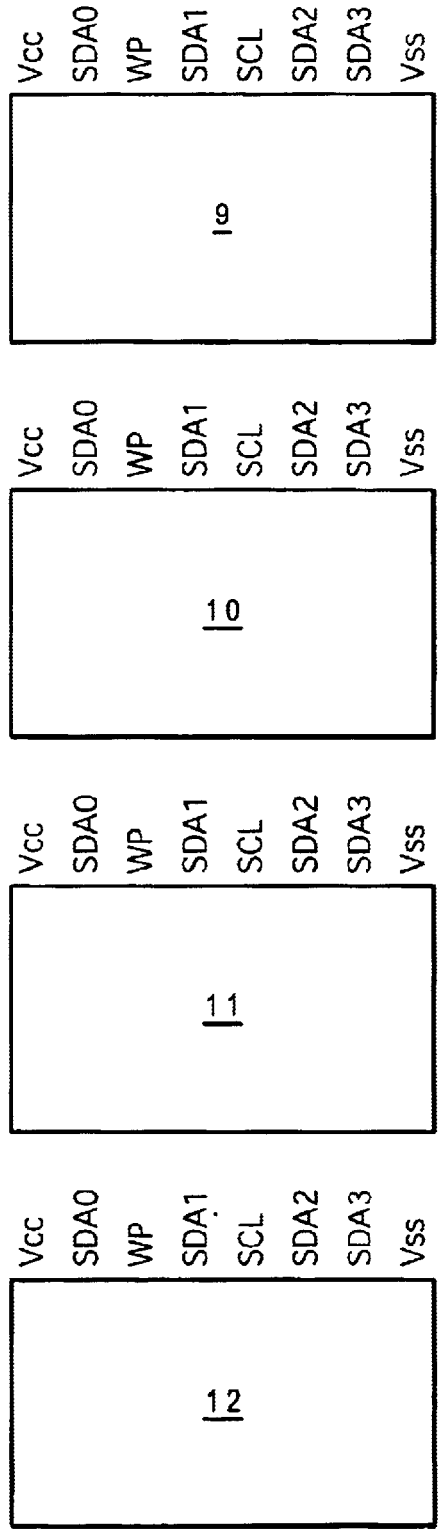
Fig. 2b

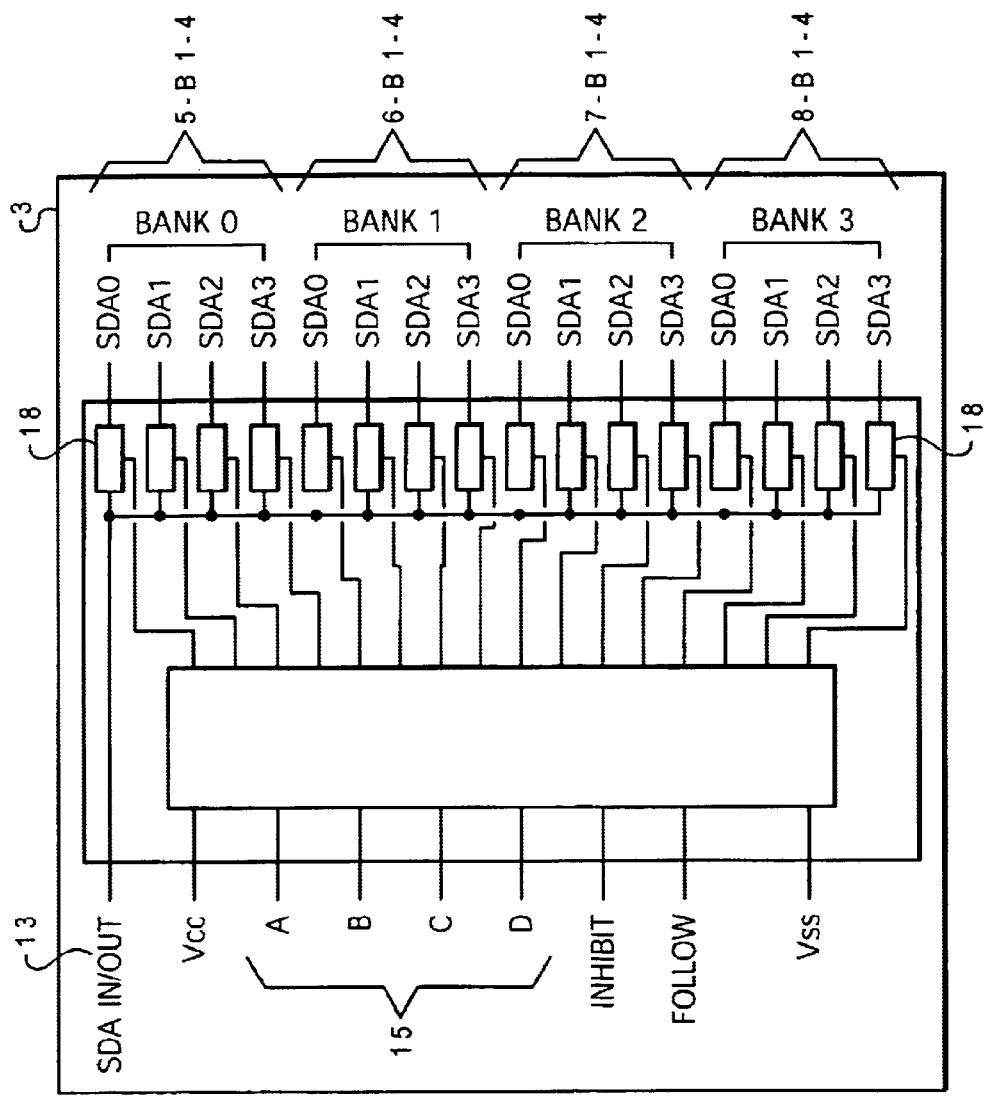

4 bit parallel address portion defines one of the serial outputs of the dispatcher. Each serial output is connected to one memory unit.

CARD MEMORY APPARATUS

The present invention relates to card memories, particularly to the provision of memory on a flexible card having an input/output device such as surface contacts. The memory may be read/writable and non-volatile.

TECHNICAL BACKGROUND OF THE INVENTION

There is a general requirement for storing data, particularly personal data, for use in various types of transactions such as health insurance, telephone calls, paying for mass transit, as well as in "set-up" boxes for satellite video or pay TV, etc. One way of doing this is digitally. For everyday personal use, such a digital data store should be compact e.g. about as big as a conventional credit card, and must be able to 1) withstand moisture—at least quick immersion and/or high humidity levels,
2) withstand dust particles encountered in handbags, coat pockets and wallets without loss of performance,
3) withstand bending without failure, e.g. when forced into a wallet,
4) be UV resistant,
5) withstand electromagnetic and magnetic fields produced by common household devices as well as small magnets without loss of data,
6) to be manufactured in high volumes at a low manufacturing cost.

There are several types of known transportable devices for strong digital data. The ubiquitous "floppy" diskette provides reliable access to 1.44 Mbyte of data storage. Although relatively robust, diskettes still require careful handling and are sensitive to dust and bending. Developments of higher storage capacity have been introduced, for example ZIP drives with capacities over 100 Mbytes. Removable hard drives such as supplied by Syquest Corporation, USA allow the storage of many hundreds of megabytes of data. Neither diskettes nor replaceable hard drives are flexible. They are sensitive to mechanical damage and dust and are not suitable for carrying in a coat pocket, in a wallet or in a lady's handbag for daily use. They are generally not used with terminals, e.g. Point-of Sale (POS) terminals for financial purposes or with other forms of data transfer, e.g. for use as identification of membership of a health insurance organization.

In addition so-called PCMCIA memory cards are known which include a 68 pin connector at one end, are usually electromagnetically shielded with metal layers on both sides, are not flexible and are about 5 mm thick. PCMCIA cards with the ability to store several megabytes of data are known, for instance, from EP 596 276, U.S. Pat. Nos. 5,293,424, 5,671,367, 5,875,480. PCMCIA cards provide a high quality connector and metallic screening suitable for installation in lap-tops and computers and are highly reliable. However, their construction is expensive and they are not very suitable for daily use in coat pockets, wallets or ladies' handbags.

Optical CD-ROM's have developed beyond their original read-only status and rewritable CD-ROM's are supplied by several companies, e.g. the Hewlett-Packard RW 8100 series. A modification to the basic idea is available which includes placing a CD-ROM type data recording medium on a flexible card, for example, LaserCard™ from Drexler Technology Corporation, USA. The disadvantage of all CD-ROM products is that the data may be corrupted by scratches. This makes them suitable for home storage of data, e.g. for music or video, but the surface is not sufficiently robust for the worst of daily uses.

Credit cards with magnetic stripes are also well know but have a very limited storage capacity. Also the data may be wiped by magnets such as the types used to attach identification badges. Long lengths of magnetic tape have also been used successfully for storing very large amounts of data and are used daily in the form of cassettes for playing music. However, they have not found favor for personal storage of data.

Next generation banking cards include microprocessors accessible through surface contacts—sometimes called "smartcards". These known devices have a higher memory capacity than a magnetic stripe card but the amount is still limited. The cards are flexible, sealed against moisture and have surface contacts which are not blocked by dust. One disadvantage of the known surface contacts is that high electrical potentials may be generated by static electricity and this may result in loss of data on discharge. To solve this problem card readers have been provided with electrostatic discharge protection as described for instance in U.S. Pat. No. 5,892,216.

Summarizing the above, there is no suitable storage device available for everyday use which is compact, reliable, has a large memory capacity and can be produced economically.

It is an object of the present invention to provide a digital storage device which is suitable for daily personal use.

It is a further object of the present invention to provide a digital storage device which has more storage capacity than smartcards while maintaining their flexibility and robustness.

It is still a further object of the present invention to provide surface contacts for a memory card which are better protected against electrostatic discharges.

SUMMARY OF THE INVENTION

One aspect of the present invention is to integrate components into a thin flexible memory card with an input/output device so that the components can cooperate as a compact unit providing environmental sealing and secure access to several Mbytes of digital data. The present invention includes a card memory device comprising: a microprocessor, a plurality of memory units for storage of digital data the memory units being embedded in the card memory device and a selecting device for selecting one of the memory units and for routing address information and data to and/or from the selected memory unit, both the microprocessor and the selecting device being embedded in the card memory device. The card memory device has an input/output device (I/O device) for receiving and for transmitting data. It is not anticipated that the form of the I/O device is a limitation on the present invention. For instance, the I/O device may comprise surface contacts for sliding introduction into a card reader. Alternatively, the card may be contactless and the input/output is via electromagnetic radiation such as radio frequency or infra-red transmission. For radio frequency transmissions the input device will generally comprise an antenna embedded in the card. An infra red input device will generally comprise a photovoltaic cell of some kind for receiving the infra red light and for converting it into electrical signals as well as a transmitting device such as an LED (light emitting diode). The power to drive the electronic components of the card may be provided from the incident electromagnetic radiation or may be provided by a battery. A serial port of the microprocessor is connected to the input device, e.g. to one of the surface contacts. Serial data is entered into or read out of the card memory device through the microprocessor. The microprocessor is preferably a secure single chip microprocessor. A serial data port of the microprocessor is connect to a serial port of the selecting device via a first serial bus. For selecting a memory unit, a parallel port of the selecting device is connected to a parallel port of the microprocessor via a parallel address bus. A parallel portion of a memory storage location (bit) address is output or input via the parallel bus. The selecting device has a plurality of serial ports each one connected to a respective memory unit via a second serial bus. The parallel address portion defines one of the input/output serial ports of the selecting device and its associated serial bus and memory unit. Once the serial bus has been selected the microprocessor then sends serial address information via the first and second busses to define a digital data storage location of the selected memory unit. Memory units may be organized in memory modules, each memory module including a plurality of memory units. Each memory unit may include one or more memory devices, e.g. memory chips.

The present invention also includes a card memory device comprising a first set of surface contacts including a ground contact, a power source contact and a data input and/or output contact, and the first set corresponding to a second set of contacts in a card memory device reader, the ground contact of the first set being arranged to ground any contact of the second set before this reader contact makes contact with any of the powder and/or data contacts. The ground contact serves to discharge any electrostatic potential on the card memory device or on the reader. Preferably, the ground contact on the card memory device surrounds the data contact three sides, e.g. it may be "U" shaped. The power contact of the card memory device may close the top of the "U"

The present invention includes the use of the card memory device described above for providing secure access to a personal computer. The present invention includes a method of secure operation of a computing device, comprising the use of a first card memory device having a microprocessor and a reader connected to the computing device for reading the first card memory device, the method comprising the steps of: configuring the operating system of the computing device so that operation is limited unless the card memory device is inserted into the reader, generating one or more codes relating to system information of the computing device; comparing the generated codes with other codes in the first card memory device, the other codes indicating validated system data for the computing device; and only allowing further unrestricted operation of the computing device if the generated and stored other codes are the same. The first card memory device is preferably a card memory device according the present invention. In particular, it is preferably thin, flexible and environmentally sealed. Preferably the card memory device has an input device which may be sliding contacts in accordance with an embodiment of the present invention. Alternatively, the input device may be contactless, e.g. a radio frequency wireless input device or an infra-red input device. Preferably, the system data includes references to software and/or hardware installed on the computing device. The method also preferably includes a validation step for validating the system data of the computing device. Preferably, if there is no match of codes, a further card memory device may be used to provide authentication to the computing device to update the first card memory device with revised codes. Preferably, the second card memory device is inhibited for further use after the authentication has been transferred a limited number of times, e.g. once. The computing device may be a personal computer or a terminal attached to a LAN or WAN.

The dependent claims each define a separate and individual embodiment of the present invention. The present invention will now be described with reference to the following drawings.

BRIEF DESCRIPTION OF THE DRAWINGS

FIG. 3 is a schematic representation of a dispatcher circuit in accordance with an embodiment of the present invention.

FIG. 6A shows the authentication scheme between a system and a memory card according to the present invention. FIGS. 6B to 6E show a verification scheme for safe installation of software in accordance with an embodiment of the present invention.

DETAILED DESCRIPTION OF THE ILLUSTRATIVE EMBODIMENTS

The present invention will be described with respect to certain embodiments and to certain schematic drawings but the present invention is not limited thereto but only by the claims. In particular, the card memory device will be described with reference to an 8-bit byte scheme but the present invention is not limited thereto. Further, the present invention will mainly be described with reference to a card memory device with contacts but the present invention is not limited thereto. For instance, the card device may have an input device which receives electromagnetic radiation such as radio frequency transmissions or infra-red transmissions. Where the card receives elrctromagnetic radiation the card device has a suitable receiver and transmitter, e.g. an embedded antenna or infra-red receiver and transmitter (LED).

Figure 1A:
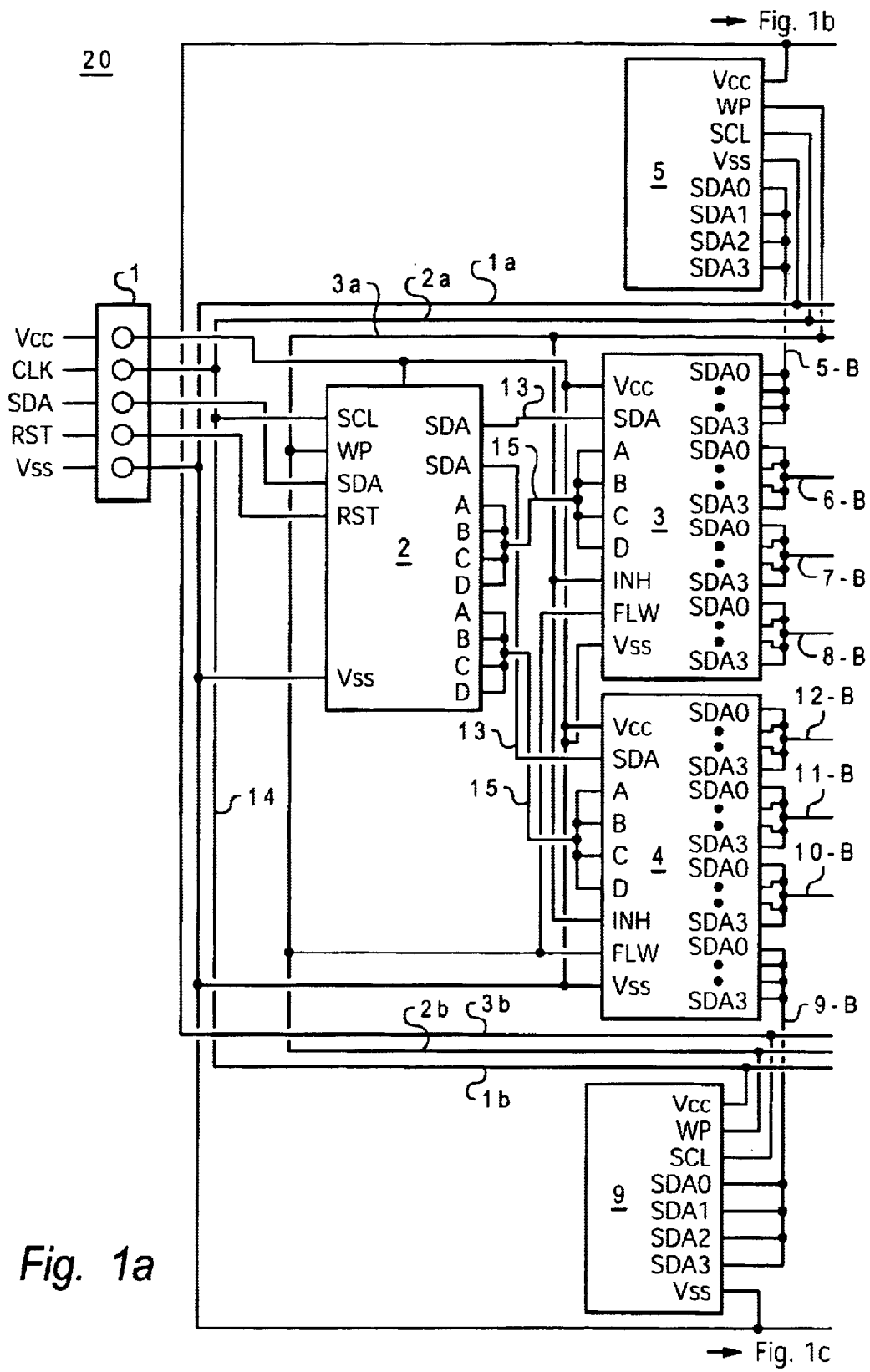
FIG. 1 is a schematic circuit diagram representation of an embodiment of the card memory device in accordance with the present invention.
Figure 1B:
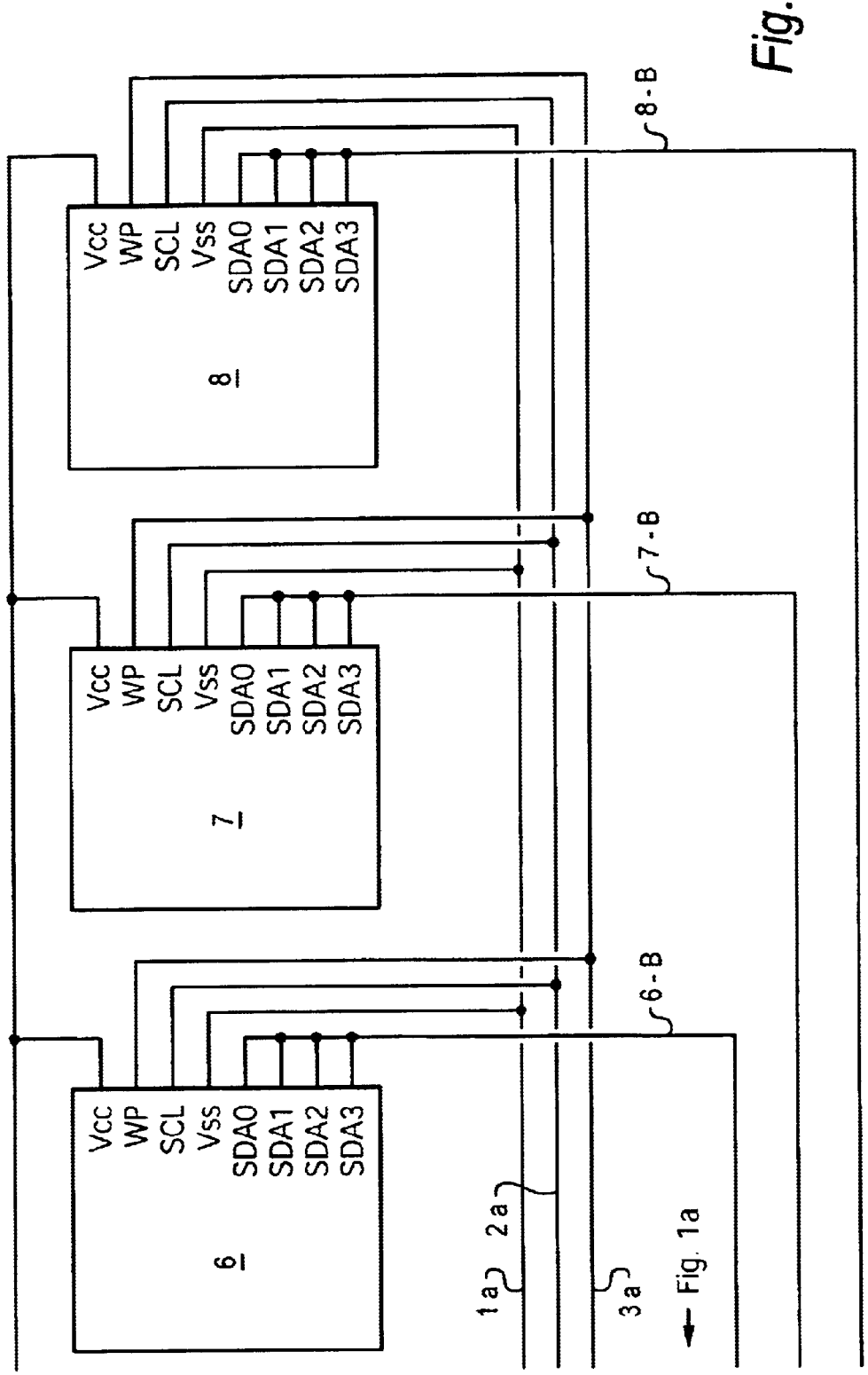
Figure 2A:
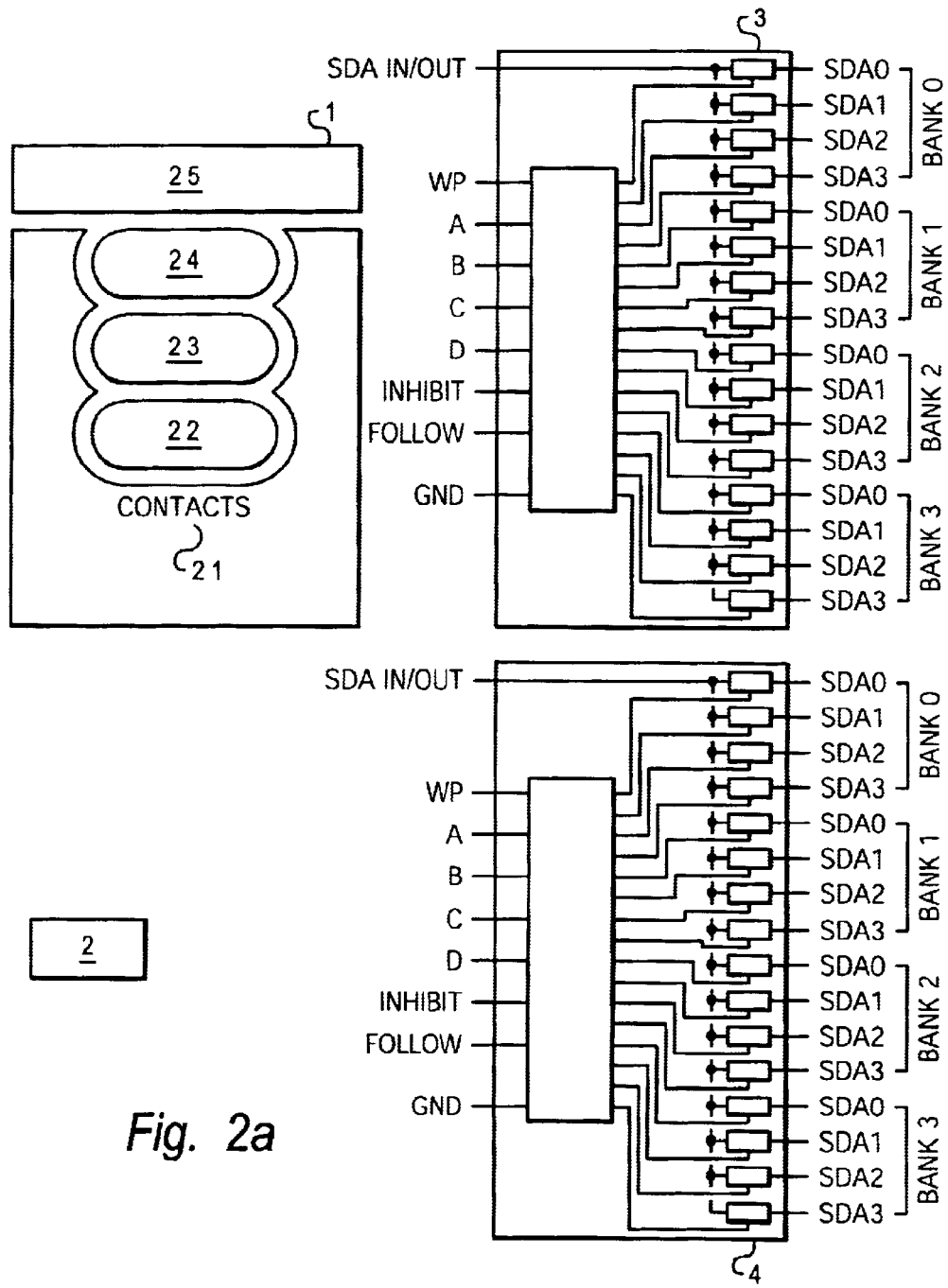
FIG. 2 is a possible layout of the card memory device of FIG. 1 on a card.

FIG. 1 shows a schematic circuit diagram of a data storage device 20 in accordance with an embodiment of the present invention. FIG. 2 shows a possible layout of the card memory device 20 on a card. The device 20 is preferably an environmentally sealed, flexible (plastic) card with an embedded microprocessor 2 and a plurality of embedded memory modules 5–12. The dimensions of card memory device 20 may be similar or identical to those of other flexible "smartcards" such as telephone cards or credit cards which have an embedded microprocessor, e.g. 85 mm by 55 mm by 1 mm thick. The card memory device 20 has an input/output device such as a set 1 of surface contacts 21–25 which serve for connection it to a suitable card reader. The card reader may be a stand-alone reader, or may be included in a personal computer, in a lap-top, in a palm-top, in a terminal connected to a telecommunications network for communication with a remote computer, or similar. The set 1 of contacts provides power input (Vcc), serial data input/output (SDA), ground potential input (Vss), a clock input (CLK) and a microprocessor reset (RST) connections. The microprocessor 2 is preferably a single chip secure microprocessor of the type SCENIX SX/18 as supplied by SCENIX, USA. Included on the microprocessor chip is preferably read-only memory (ROM) for the storage of application programs and for all operating conditions for the device 20, random access memory (RAM) and optionally non-volatile read/write memory of which at least a part is preferably protected memory for the storing of data required for power up and initialization of the device 20.

The power input contact (Vcc) of set 1 is connected to the power input of the microprocessor 2, similarly the ground potential input (Vss), the clock input (CLK) and the microprocessor reset (RST) contacts of set 1 are connected to equivalent pins of the microprocessor 2. The SDA contact of the set 1 is connected directly to the serial data input pin (SDA) of the microprocessor 2. Hence, all data to be read from or written into the memory modules 5–12 passes through the microprocessor 2. To access card memory device 20 a communication session with the microprocessor 2 is set up via the card reader in which communication channels are opened via the SDA contact of set 1 after an authentication procedure (to be described later). It is not expected that the method of authentication is a limit on the present invention. In particular, suitable authentication methods may include the use of public and/or private keys and/or specific session keys as is known to the skilled person. In addition, the present invention may include the requirement that the owner of the card memory device 20 is required to enter one or more personal identification numbers (PIN) at the card reader before authentication and verification is complete. In addition, the present invention may include a restriction on the number of times a PIN may be entered before the card is blocked and further access is denied. In addition, the present invention may include the requirement that the operator of the card reader (different from the owner of the card memory device 20) is additionally or alternatively required to enter a PIN, account, service or system number (either directly through a key pad or indirectly by the transmission of a code number or numbers from the memory of the card reader to the microprocessor 2) so that the microprocessor 2 can verify that the card reader belongs to a group of authenticated card readers allowed to access the data on the card memory device 20.

Embedded in the card memory device 20 is a plurality of memory modules 5–12 one of which shown best in FIG. 5. These memory modules 5–12 may include volatile, e.g. RAM, or non-volatile read-only such as ROM or read/writable non-volatile memory units 16. The memory units 16 may also be one-time programmable memory units. The memory units 16 of the memory modules 5–12 preferably do not require refresh. The memory modules 5–12 are preferably electrically erasable programmable read only memory (EEPROM) modules. Each module 5–12 may be composed of several individual memory units 16, each memory unit 16 comprising a plurality of memories 17, for instance, memory chips, e.g. one module 5–12 may contain four units 16 of eight EEPROM memories 17 each storing 32 or 64 Kbytes of digital data, e.g. 24FC256 memory chips as supplied by Microchip USA, or the 24XA512 chips as supplied by Siemens Germany. Hence, a total storage capacity for each module 5–12 may be 4×8×64=2048 Kbytes and a total for the card memory device 20 of 8×4×8×64 Kbytes=16 Megabyte. By changing the memory capacity of each memory module 5–12 of by changing the number of them, the memory capacity of the card memory device 20 may be easily selected between 2 and 16 Mbytes.

To provide power (Vcc), ground (Vss), clock signals (SCL) and write protect (WP) for all memory modules 5–12 a card bus 14 is provided. For the microprocessor 2 to address and to read and write data from and to each memory module 5–12, a system of parallel and serial busses 5-B . . . 12-B, 13, 15 is provided. The addressing scheme in accordance with the present invention is a novel hybrid parallel/serial address scheme. Each address of a memory location in a memory module 5–12 is defined by a serial address portion and a parallel address portion. Each memory module 5–12 is provided with a plurality of serial busses 5-B1-4, 6-B1-4, . . . 12-B1-4 for carrying serial data and the serial portion of an address. Each memory unit 16 of each memory module 5–12 has its own unique serial bus 5-B1-4 . . . 12B1-4. To select the required serial bus 5-B1-4, . . . 12-B1-4 at least one bi-directional multiplexer-dispatcher 3, 4 is provided. The multiplexer-dispatcher 3, 4 is preferably constructed as an application specific integrated circuit (ASIC). The inputs and outputs of a multiplexer-dispatcher 3, 4 are shown in FIG. 3. The inputs from the microprocessor 2 include a serial data connection (SDA) connected to a serial bus 13 for receipt and transmission of serial data to and from the microprocessor 2 and hence to and from the card memory device 20 as well as receipt and transmission of the serial address portion of addresses for the memory modules 5–12. All communication i.e. selection of memory modules 5–12, selection of EEPROM chips 17 within a module 5–12 and transmission of addresses and serial data are inhibited by the appropriate signal placed by the microprocessor 2 on the INHIBIT connection of the multiplexer-dispatcher 3, 4. Preferably, the INHIBIT pins of multiplexer-dispatchers 3, 4 are ganged so that all multiplexer-dispatchers 3, 4 are inhibited together. This differs from the circuits described in U.S. Pat. No. 5,293,424 in that in these known circuits each memory module includes a lock circuit and so denial of access to one memory module does not prevent access to other memory modules. Also, it differs from the known circuits of U.S. Pat. Nos. 5,671,367 and 5,875,480 in which the address bus may be blocked to the memory on the card, but the serial data bus remains open to the memory.

Optionally, after inhibiting the multiplexer-dispatcher(s) 3,4, the microprocessor 2 may write a flag to a register in its protected non-volatile memory so that on power-up of the microprocessor 2, it reads the state of the flag in its memory, and if the flag has been set, microprocessor 2 inhibits the operation of multiplexer-dispatchers 3, 4, i.e. so that power down and power-up will not lift the blocked communication state. A special procedure may be necessary to release the card memory device 20 from its inhibited state.

Parallel pins A, B, C, D of the multiplexer-dispatcher 3, 4 are connected to the parallel bus 15 from the microprocessor 2. These are provided for the parallel portion of the addressing scheme in accordance with the present invention. An appropriate signal (logic 1 or 0) on the FOLLOW pin of the multiplexer 3, 4 prevents a change in the address selected by the dispatcher 3, 4 until the signal changes to the other logical value.

Each multiplexer-dispatcher 3, 4 has 16 serial data outputs 18 labeled SDA0–3 organized in banks of four. Each serial data output 18 is routed to one of the four memory units 16 of a memory module 5–12 via its unique serial bus 5-B1-4 . . . 12-B1-4. Each bus 5-B1-4 . . . .12-B1-4 is connected to the respective pin SDA0–SDA3 of the relevant memory module 5–12 and the respective pin SDA0–SDA3 of the multiplexer/dispatcher 3, 4. Which serial bus 5-B1-4 . . . 12B1-4 is selected depends on the parallel portion of the memory card address which is available on the parallel bus 15 from the microprocessor 2. The parallel portion of a memory card address is shown schematically in FIG. 4A. The four bits provide 16 different addresses. For example, 0000 may select the memory unit 16 defined by the bank 0, SDA0 pin of the multiplexer/dispatcher 3. This pin is connected to serial bus 5-B1 and the pin SDA0 of the memory module 5. 1111 selects the memory unit 16 defined by the bank 3, SDA 3 pin of the multiplexer/dispatcher 3 which is connected to the serial bus 8-B4 for connection to the memory unit 8. Hence, the parallel portion of the memory address determines which of the 4×4=16 512 Kbytes memory units 16 are selected. Each memory unit 16 includes up to 8×64 Kbytes EEPROM memories 17.

Figure 4A:
FIG. 4A shows a parallel four bit addressing scheme for selection of a memory unit in accordance with an embodiment of the present invention.
Figure 4B:
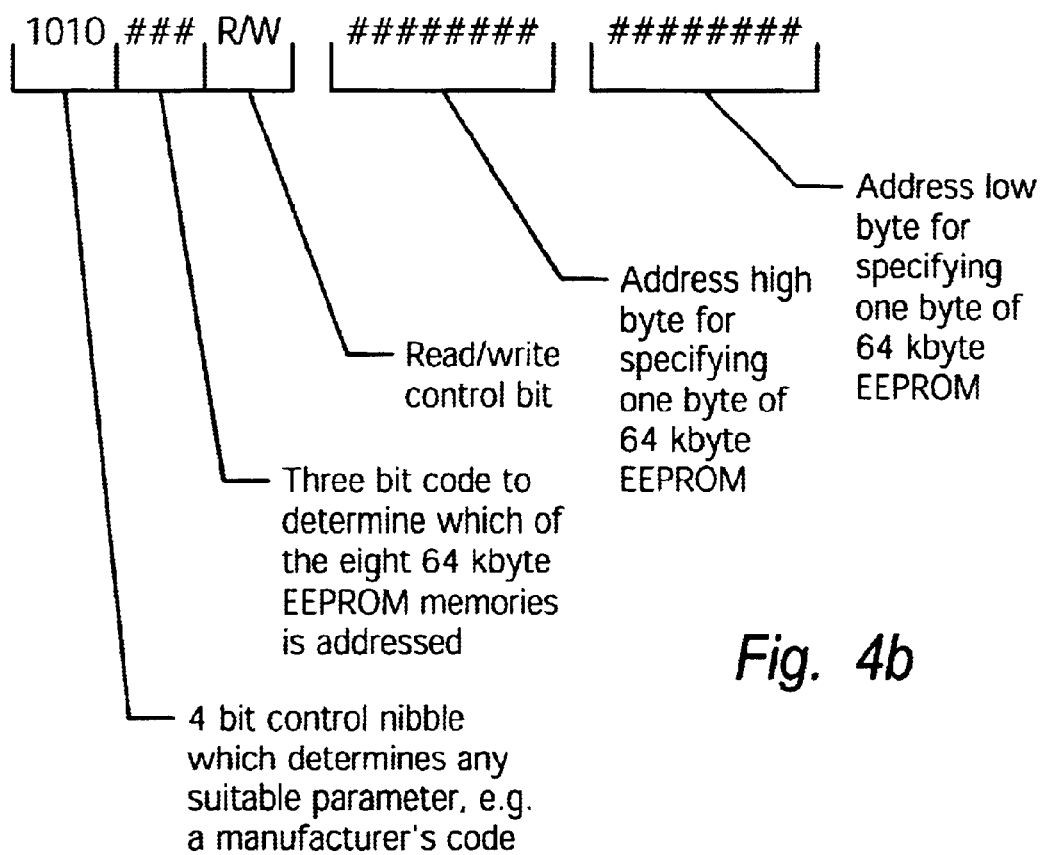
FIG. 4B shows a three byte serial addressing scheme in accordance with an embodiment of the present invention.
Figure 5A:
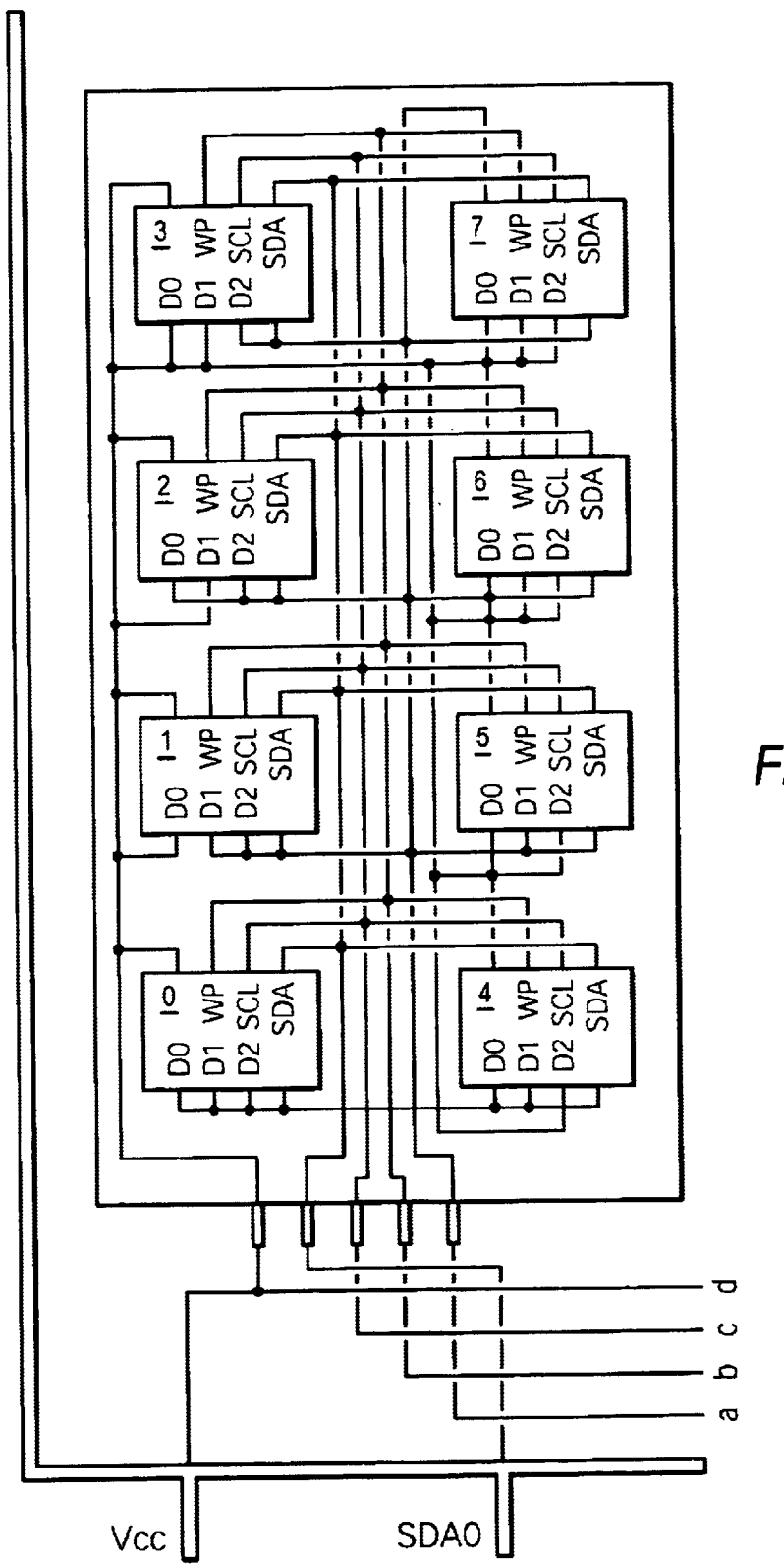
FIG. 5 is a schematic representation of a memory module in accordance with an embodiment of the present invention.
Figure 5B:
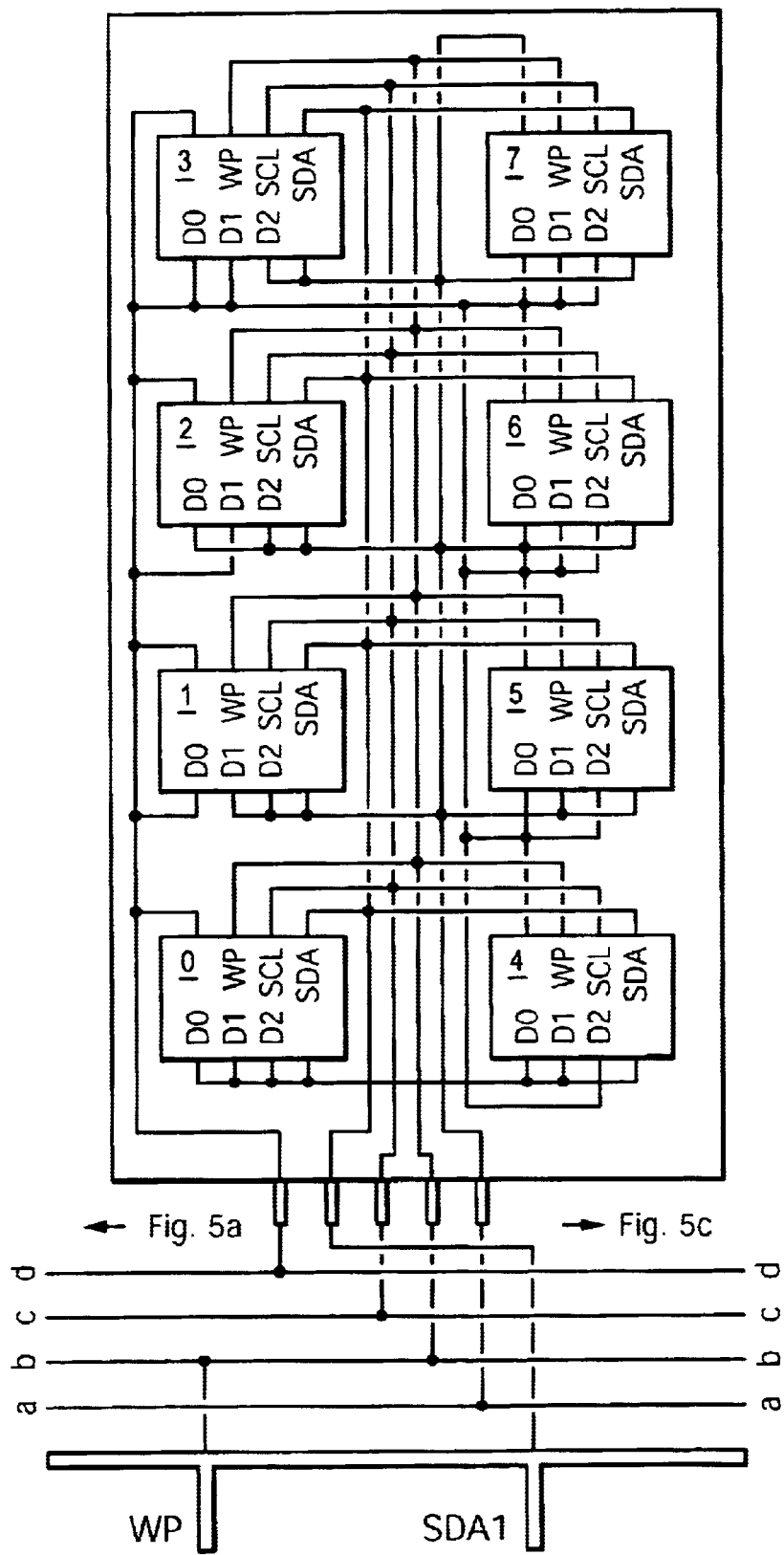
Figure 5C:
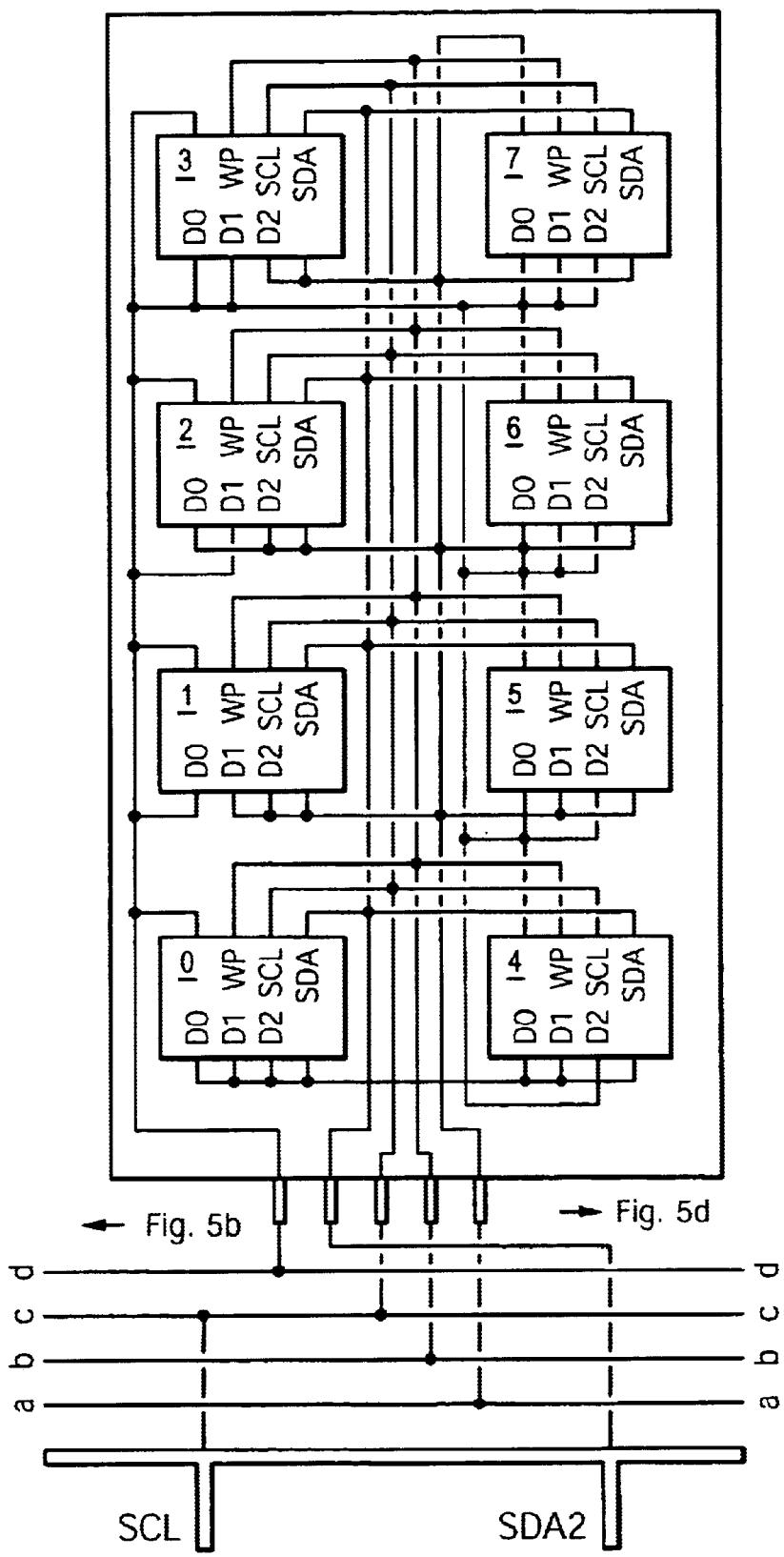
Figure 5D:
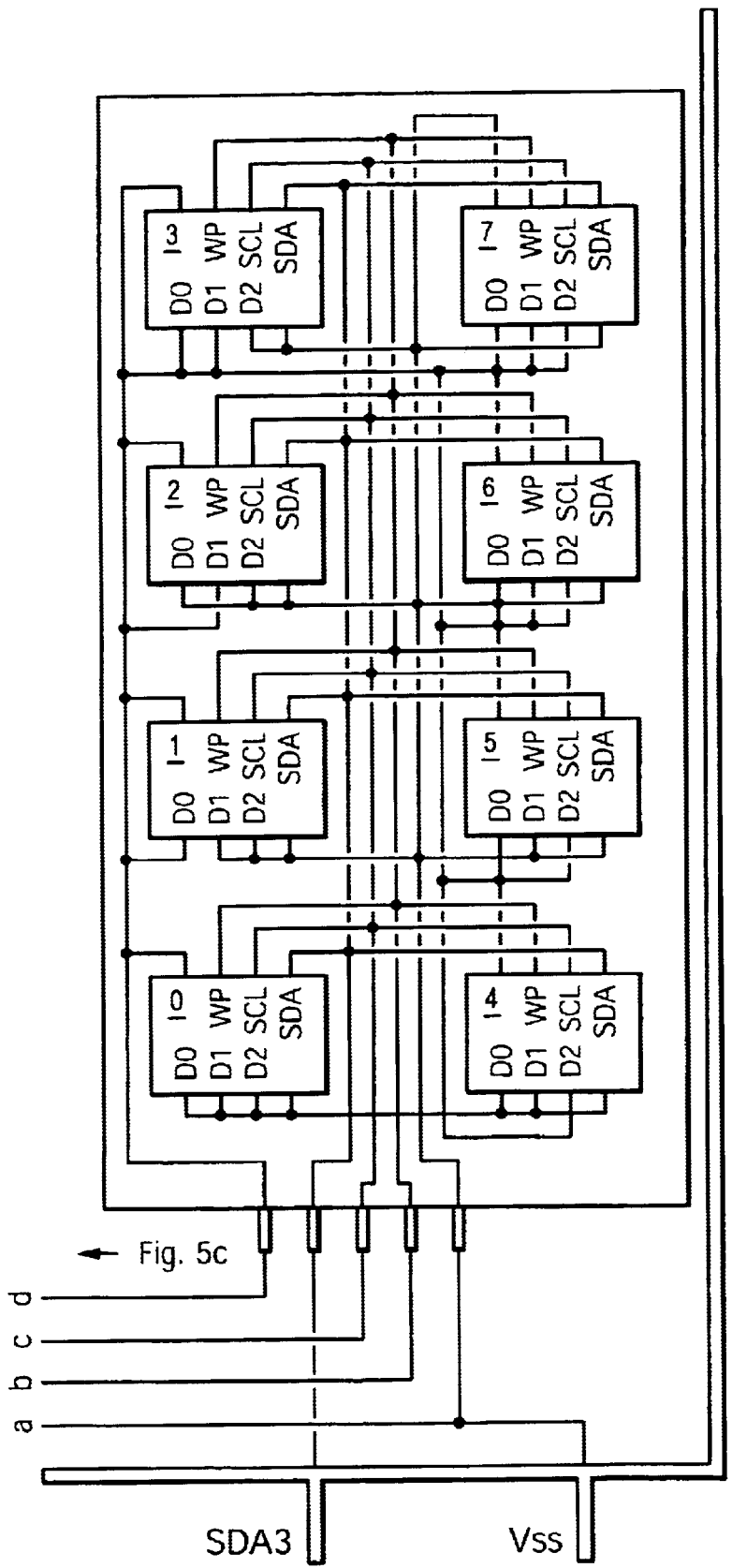

The serial portion of the addressing scheme of the card memory device 20 may be as shown in FIG. 4B (3 byte serial address). The first 4 bits of the first byte may be used to define any suitable parameter, e.g. a manufacturer's code, for instance 1010 for the initialisation of the serial port of an EEPROM. The next three bits determine which of the eight 64 Kbytes EEPROM memories 17 is selected from one 512 Kbytes memory unit 16. The final bit of the first byte determines whether a read or write is performed. The next two bytes (the address high and low bytes) determine which of the 64 Kbytes storage locations of a particular memory 17 are to be written or read.

A representative memory module 5 is shown schematically in FIG. 5. Each of the serial busses 5-B1-4 is connected to one of the pins SDA0–3 of the four memory units 16. Each memory unit 16 comprises at least one memory 17. The connections for power (Vcc and Vss) to the memories 17 and for the clock input (SCL) are connected to the card bus 14 and hence with the set 1 of contacts. The write protect (WP) pin of the memory module 5 is connected to the respective pin of the microprocessor 2.

The card memory device 20 may be operated in several different modes each one of which is a separate embodiment of the present invention. Firstly, the microprocessor 2 may convert each memory address requested via the card reader into the hybrid card address described above using an algorithm. For instance the microprocessor 2 has a resident program stored in its ROM for calculating a hash or one way function. This algorithm may be based on a key which is stored in the ROM or more preferably in the protected read/write memory of the microprocessor 2 at manufacture thereof. The key used for each card memory device may be different even if the same algorithm is used. On receipt of an address for reading or writing the microprocessor 2 operates on the input address and generates therefrom the four bit parallel portion of the memory card address as well as the three byte serial portion of the memory card address as shown in FIGS. 4A and B using hash or one way functions. The microprocessor 2 then uses this encrypted hybrid address for reading or writing the data. By this means the actual data stored in any one memory module 5–12 is pseudorandomly sorted so that attempts to analyze the data on the card 20 by external probes will be fruitless. Further, even if the operation of one card memory device 20 is analyzed it gives no indication of how other cards operate. Firstly, one of the properties of hash functions or one way functions is that it is almost impossible to derive the function from its results. Secondly, the operation of the hash function or one way function depends upon the value of the key stored in the protected memory of the microprocessor 2 so that the address encryption is different for each card memory device 20. When the memory modules 5–12 are RAM modules, i.e. the data is lost on power down, the key for generating the encrypted addresses may be changed randomly on power-up so that the encrypted addressing differs from session to session.

In a second mode, which may be optionally combined with the first mode, the microprocessor 2 allocates a block of addresses of the memory modules 5–12 when a write request is received. If a later write address is within the same block, the microprocessor 2 selects that block again. If the later requested write address lies outside the first block, the microprocessor 2 creates a second block of addresses. The microprocessor 2 continues with this procedure until all the memory locations of card memory device 20 have been allocated. By this procedure the card memory device 20 can operate with a computer or other microprocessor which has a greater addressing range than is provided by the card memory device 20. By creating blocks, widely differing blocks of addresses of the computer or other microprocessor may be allocated onto the card memory device 20. To keep track of the blocks, i.e. the memory map of the card memory device 20, the microprocessor 2 may record the blocks, their sizes and the addresses to which they correspond in its protected non-volatile read/write memory.

In a third mode of operation, the microprocessor may have a data compression application program stored in its ROM or read/write non-volatile memory. This application may be called to compress data on writing and to decompress data on reading. The host computer or terminal which includes the card reader for communication with the card memory device 20 does not require knowledge of the compression algorithm which is handled completely by the microprocessor 2.

Similarly, in a fourth mode of operation microprocessor 2 may include an encryption and decryption algorithm for encrypting data before writing and decrypting read data. This improves the security of the data on the card 20. Not only is the data then pseudorandomly distributed among the memory modules 5–12 by application of the first mode of operation but also the data is encrypted. The key or keys for the encryption algorithm may be stored in the non-volatile read/write memory of the microprocessor 2 on initialization of the card memory device 20, e.g. during manufacture. Protected read/write memory on the microprocessor chip of the card memory device 20 may be used for temporary storage of intermediate results typically generated by encryption algorithms.

To improve the security of the memory card device 20 still further, the microprocessor 2 is preferably programmed to carry out an authentication routine when card memory device 20 is introduced into a card reader. As indicated above, it is not anticipated that the type of authentication will affect the present invention materially.

Figure 6A:
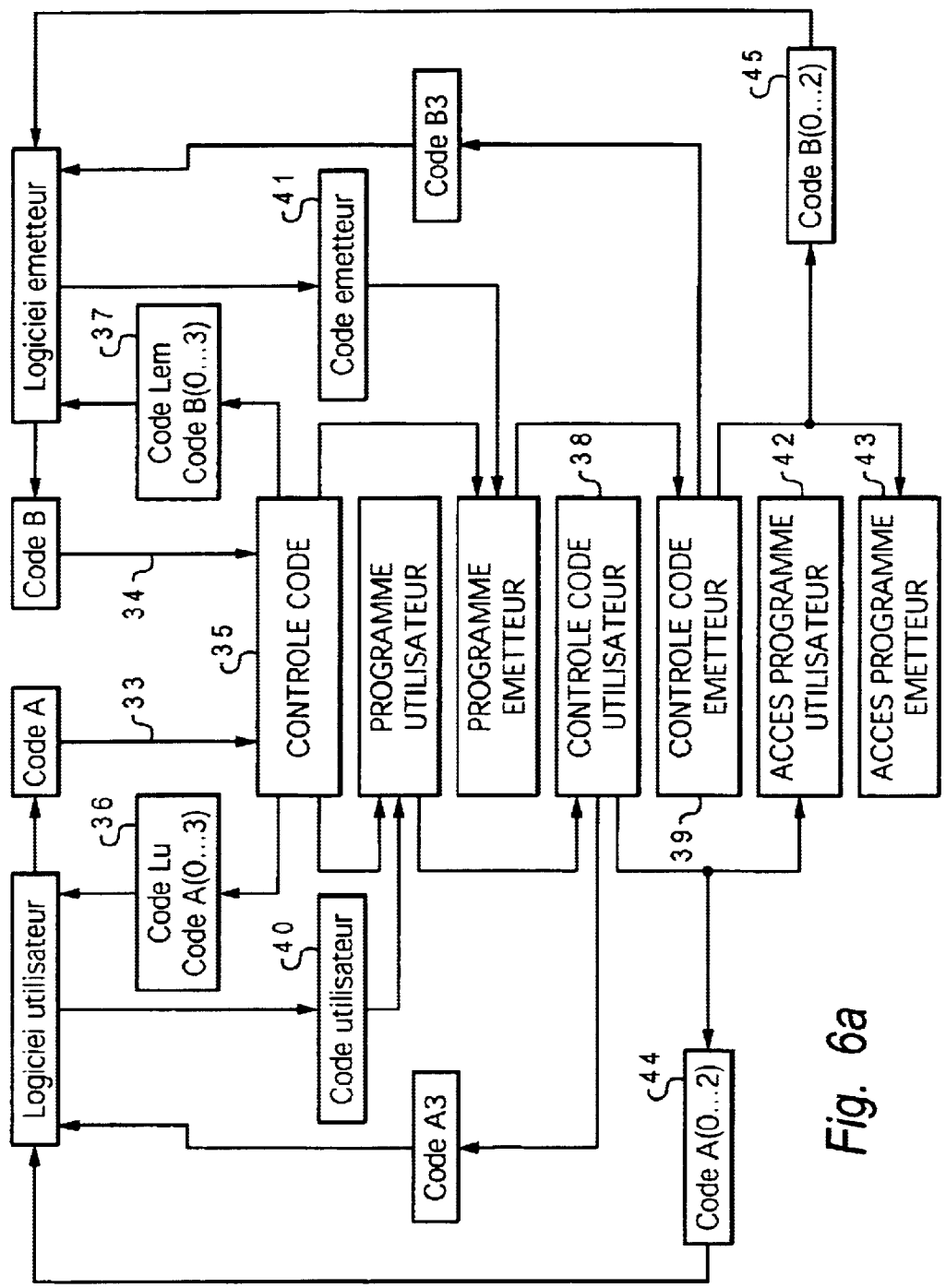
FIGS. 6A to 6E show authentication schemes which may be used with the present invention.

FIG. 6A is a schematic flow diagram of one possible authentication scheme in accordance with an embodiment of the present invention. The memory card 20 is placed in a suitable card reader 31 which is part of a processing device 30 such as a personal computer as shown schematically in FIG. 7. The card reader may be for physically contacting a set of contacts on the card device 20 or it may be a remote reading device such as those which use electromagnetic radiation to communicate. The processing device has a microprocessor 32. Software programs are pre-loaded into the memories of both the processing device 30 and the microprocessor 2 on the card 20 After power-up of the microprocessor 2 via the Vss and Vcc contacts 21, 25 using power supplied from the reader 31, the authentication program starts on microprocessor 2 of the card device 20. The authentication scheme shown in FIG. 6A allows verification of both the card 20 and the processing device 30 as well as the software programs running thereon but the present invention is not limited thereto. For instance, the verification could be restricted only to the card 20. In step 33, the microprocessor 2 requests the entry of a code A, e.g. a personal identification code (PIN) from the user. The user then inputs the code A. Similarly, the card 20 may request a code B in step 34 from the processing engine 30 in order to check that the processing engine 30 is a verified one. Both code A and B are compared with pre-stored codes in the memory of the microprocessor 2 on card 20 in step 35. If code A is verified as correct the microprocessor 2 on card 20 generates a user acceptance code 36 which is stored for this session. If code B is correct the microprocessor 2 generates a processor acceptance code 37 which is transmitted to the processing device 30. If either of the codes is incorrect, a non-acceptance code is generated and two further entry attempts are permitted. If either of the microprocessor 32 of processing engine 30 or microprocessor 2 are blocked (due to previous fraudulent use) all activity stops. The results of the acceptance code control is finally checked by the processing engine 30 in step 39 and by the microprocessor 2 in step 38. If no correct code A or code B has been entered after three tries the respective one of the microprocessor 2 and the processing device 30 outputs a blocking code A3, B3, respectively and all activity stops. As part of steps 38, 39 a further check is made that the card 20 and/or the processing engine 30 have not been modified in a fraudulent manner. To achieve this the input of further codes 40, 41 are requested from the card 20 and the microprocessor 32 of the processing device 30. Transfer of these codes may occur without user intervention. The codes 40, 41 may be generated by a suitable algorithm from the registry numbers of software programs running on the microprocessor 2 and the microprocessor 32 of processing engine 30 as well as from the reference numbers of hardware such as hard disks. Alternative methods of generating codes 40, 41 using data available in the microprocessor 2 and the processing engine 30 in order to identify any change in the programs running on either are included within the scope of the present invention. Codes 40, 41 may be large in size. They are therefore preferably stored in the memory of the memory modules 5–12 of the card device 20 in accordance with the present invention. Microprocessor 2 on the card device 20 then compares the stored and received codes 40, 41.

If the final check indicates that all codes are correct, access to the programs of the card 20 and the processing engine 30 are allowed in steps 42 and 43 respectively. In this case final complete acceptance codes 44, 45 are generated.

Figure 6B:
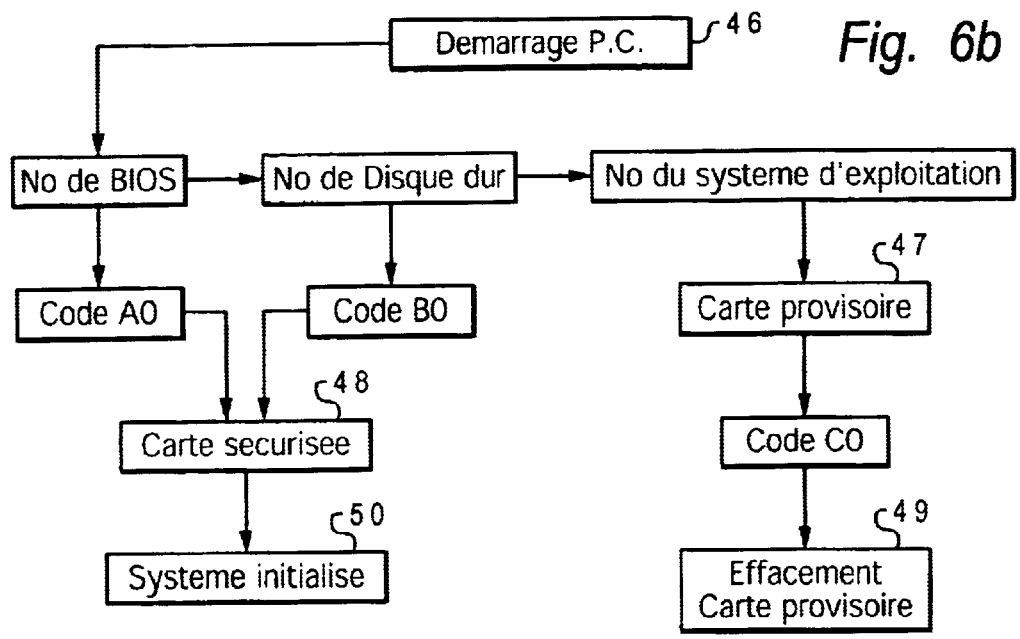
Figure 7:
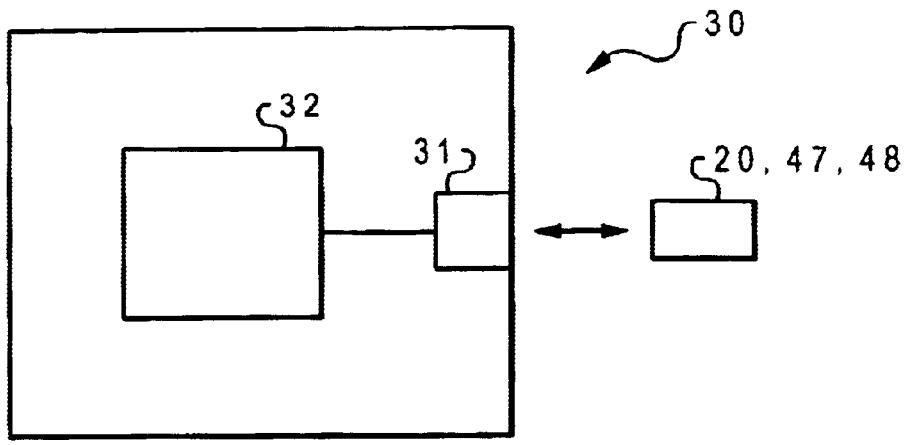
FIG. 7 is a schematic representation of a card reader and processing device with which the present invention may be used.

FIG. 6B is a schematic flow diagram of the use of the card 20 to instantiate a new personal computer 30 and validate its software and/or hardware after purchase in which the processing device 30 is a personal computer shown schematically in FIG. 7. The personal computer 30 is configured for safe access by a user possessing a card memory device 20 in accordance with the present invention. To maintain security the personal computer 30 cannot run unless a validated card 20 is inserted in the reader 31. Card 20 also checks that software running on personal computer is authorized software. When the user purchases the computer he/she is provide with a security card device 48 which may be a card memory device 20 in accordance with the present invention. The card 48 has software programs loaded into the microprocessor 2 for carrying out the verification and validation functions described with respect to the present invention. The user is also provided with one or more "temporary cards" 47. Temporary card 47 may also be a card memory device 20 in accordance with the present invention. The purpose of the temporary card 47 is to allow an update of card 48 with validation data. Once the update is completed the data on card 47 is destroyed and the card is blocked from further use, e.g. by permanently invoking the INHIBIT function mntioned above.

The personal computer 30 is started in step 46 and the operating system halts until a security card 48 is inserted in the reader 31. The card 48 is powered up and the verification program starts to run automatically on microprocessor 2 of card 48. Card 48 requests at least one code A0, B0, C0 from the personal computer 30. The codes A0, B0, C0 are preferably generated by the personal computer 30 from system data on the personal computer 30 which provides an identification of the personal computer and the software running thereon. For example, code A0 may be generated from the number of the BIOS of the personal computer, the code B0 from the number or hardware, e.g. the hard disk of the personal computer and code C0 may be generated from the registration numbers of the software running on the personal computer 30, e.g. the operating system such as Microsoft's "Windows" graphical user interface. Code C0 may be a concatenation of all the other codes A0, B0. The card 48 interrogates its read/write non-volatile memory e.g. like the memory modules 5–12 of a card memory device 20 in accordance with the present invention, to retrieve the code or codes A0, B0, C0. On first instantiation of the personal computer 30 these codes will not be present on card 48. Card 48 then requests insertion of the temporary card 47 into reader 31. Card 48 is then removed from reader 31 and card 47 is inserted. Card 47 provides the authorization to computer 30 to load the codes A0, B0, C0 one time onto card 48. Once computer 30 has received this authorization, all data on card 47 is destroyed and the card is blocked in step 49, e.g. by permanent inhibition using the INHIBIT function described above. Card 48 is substituted for card 47 in the reader 31 and codes A0, B0, C0 are written to the read/write non-volatile memory of card 48. The card 48 is now initialized with the codes A0, B0, C0. Any attempt to change any software running on computer 30 will change one or more of the codes A0, B0, C0 and the card 48 will generate an error message on start-up.

Figure 6C:
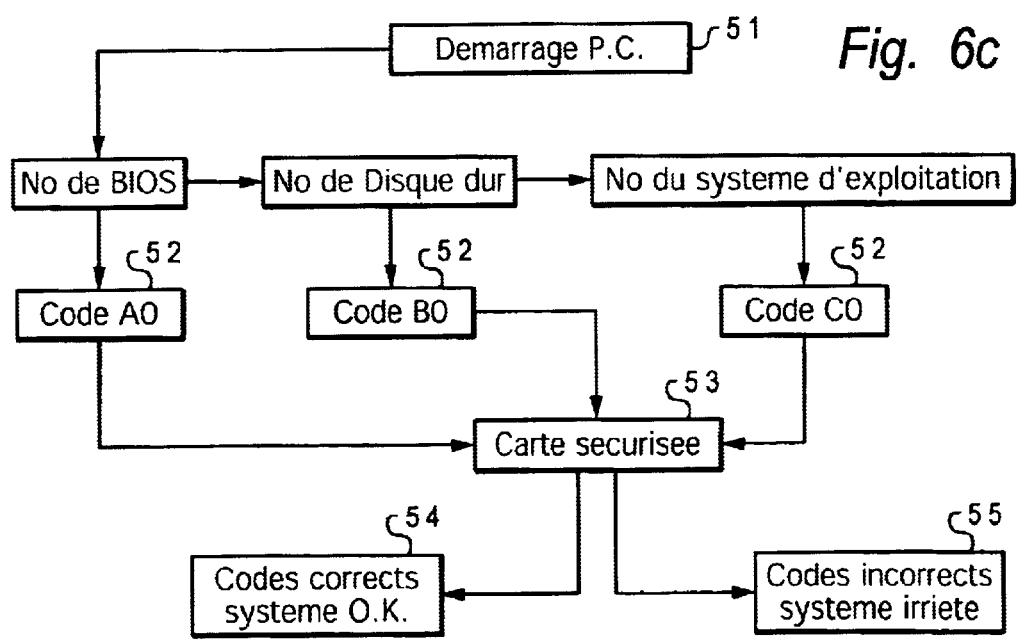

The next start-up of the computer 30 is shown in FIG. 6C. The computer 30 is started in step 51 and the operating system halts until card 48 is inserted in reader 31. Card 48 then checks if it has the required one or more codes A0, B0, C0 stored in its non-volatile memory. Codes A0, B0, C0 represent validated software and/or hardware on computing device 30. As it has been initialized, the card 48 has these codes already stored in the modules 5–12. Card 48 then requests input of the one or more codes A0, B0, C0 from personal computer 30. These codes are generated from the system information of computer 30 as described above and transmitted to card 48 in step 52. In step 53, the received and stored codes A0, B0, C0 are compared by the card 48 and if they are correct the card 48 provides the necessary instructions for the computer 30 to continue operation in step 54. If the codes A0, B0, C0 do not match, the computer 30 is halted in step 55.

To prevent unauthorized cards 48 being used the above scheme may be modified by the addition of a random number RAND which is supplied by the computer 30 as well as the one or more codes A0, B0, C0. If the codes are correct the card 48 operates on the random number with an algorithm such as a one-way function or a hash code. The result Sres of this operation is transmitted to personal computer 30. Personal computer 30 calculates Sres from the random number and the same algorithm. Is the received and calculated Sres match then the computer 30 may continue operation. If card 48 determines that one of codes A0, B0, C0 is incorrect, a random number Srand is generated having the same format as Sres and transmitted to the computer 30. When computer calculates Sres from RAND and compares with Srand it determines that they are different and operation is blocked.

Figure 6D:
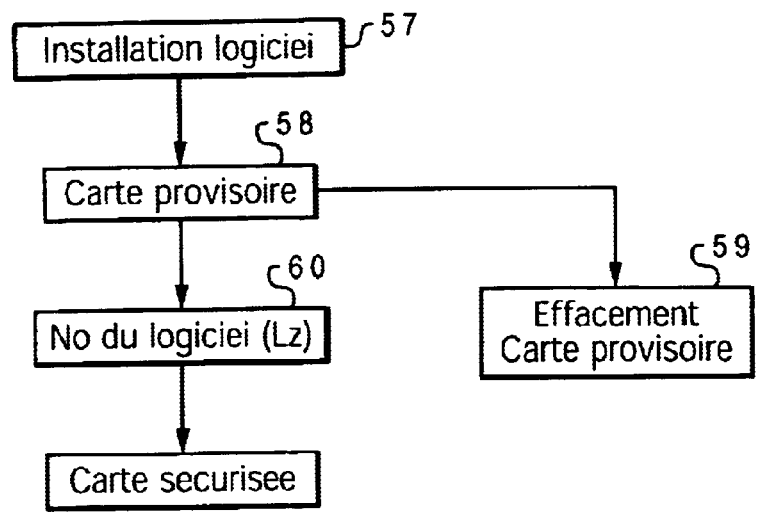

FIG. 6D is a schematic diagram of how a new software program is installed on a computer as well as validating this software with the security card 48. The software is provided with a further temporary card 47 as described with respect to FIG. 6B. The starting point is an actively running computer having completed step 54 of FIG. 6C. The new software is installed on the computer 30 in step 57. At the end of loading the revised relevant code A0, B0, C0 is calculated from the registration number of the new software. The computer 30 then halts and requests entry of the temporary card 47 in step 58. Card 47 is inserted in reader 31 and provides computer 30 with the necessary authorization to load the revised code or codes A0, B0, C0 onto security card 48. Computer 30 then destroys all data on card 47 in step 59 and card 47 is blocked in step 59, e.g. by permanent setting of the INHIBIT function mentioned above. Card 47 is now removed from reader 31 and card 48 inserted. The computer 30 then writes the new code(s) A0, B0, C0 onto card 48 in step 60. Card 48 is now initialized with the updated codes A0, B0, C0. These represent validated system data for personal computer 30.

Figure 6E:
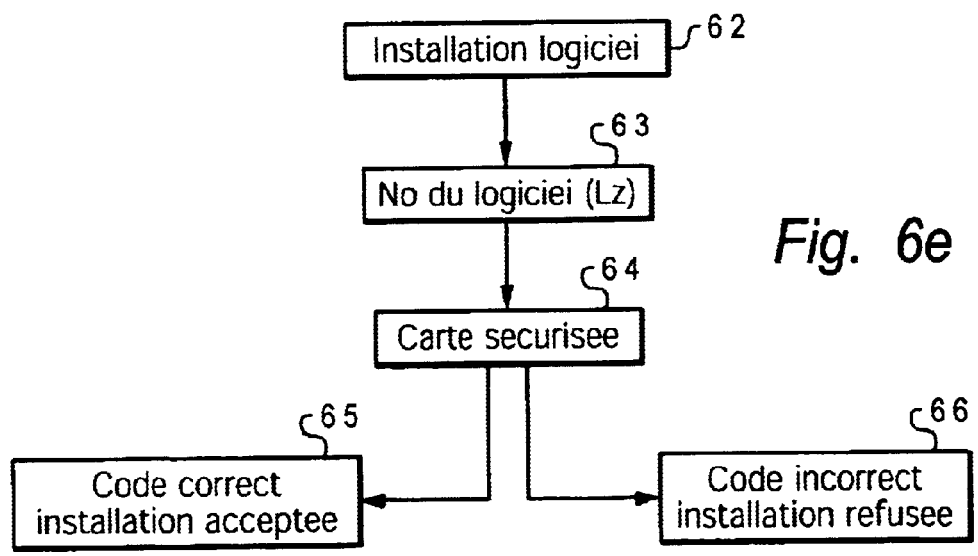

The reinstallation of software onto computer 30 is shown schematically in FIG. 6E. Let us assume that due to a virus or for some other reason certain programs have been corrupted on personal computer 30. In 62 the software is reinstalled. In step 63 the relevant code or codes A0, B0, C0 are calculated by personal computer 30 for the re-installed software. This code or codes is checked with the code or codes already stored on the card 48 in step 64. If they agree the operation of computer 30 is continued in step 65. If the codes are incorrect the computer may be halted in step 66 and for example the entry of a temporary card 47 may be requested.

The description above with respect to FIGS. 6A to E has been made with reference to a single user and a single personal computer. The above methods and hardware can be extended to include the use of a single security card 48 with a plurality of computers. For example, the employees of a company may be provided with security cards 48 which operate with a group of computers. Each card then has a copy of all the codes A0, B0, C0 for all the computers with which it is to work. By this means a user may log-on to any computer in the group. Further, the use of security card 48 may be extended for use with a local or wide area network provided the relevant codes identifying the respective LAN, WAN are available and stored on card 48.

Figure 8:
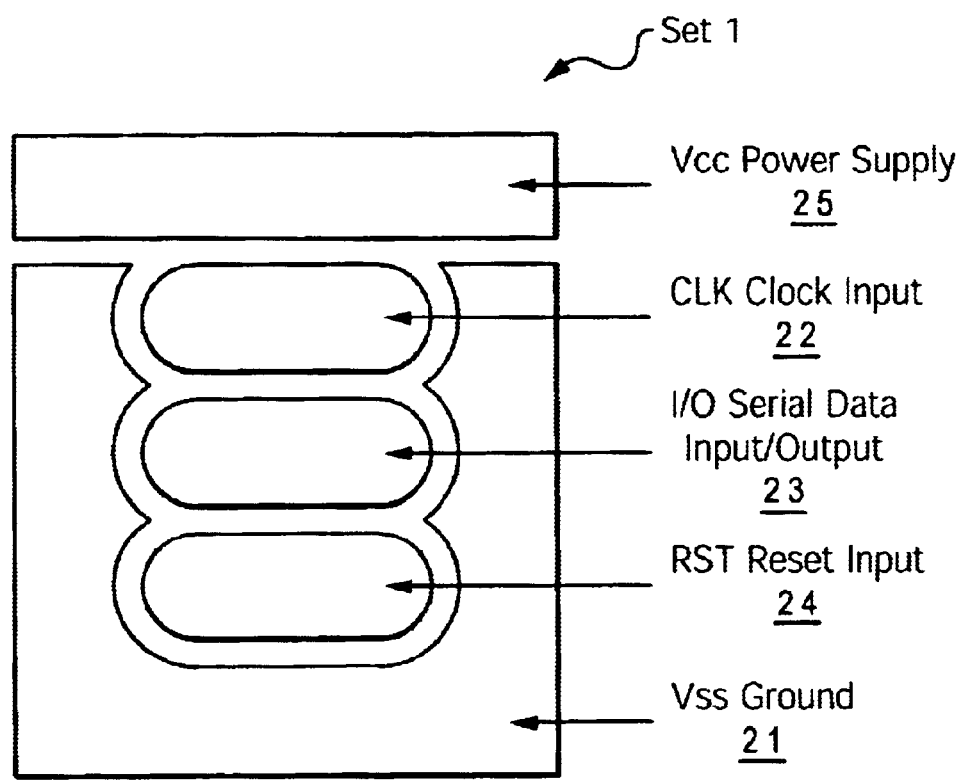
FIG. 8 is a top view of surface contacts suitable for use with the embodiment of the present invention shown in FIGS. 1 and 2.

FIG. 8 is a schematic top view of surface contacts 21-14 25 of set 1 for use with the card memory device 20 in accordance with an embodiment of the present invention. Preferably, the ground contact 21 (Vss) is placed on the card in such a way that it enters the card reader first when the card memory device 20 is inserted into the reader. The memory card device 20 is intended to be inserted into a card reader having a slit opening designed to allow sliding entry by memory card device 20 but to prevent entry by other objects. The ground contact 21 is therefore preferably placed closest to one edge of the card memory device compared to the other contacts 22–25. The ground contact 21 is preferably "U" shaped and encloses the clock signal contact 22 (CLS) the serial data input/output contact 23 (SDA) and the reset contact 24 (RST) on at least three sides. The order of the reset, data input/output and clock contacts 22–24 is not considered to be a limitation on the present invention. The power contact (Vss) 25 may be placed across the top of the "U" of the ground contact 21 as shown in FIG. 8. Preferably the power contact 25 is placed furthest from the side of the car memory device which first enters the card reader. The contacts 21–25 may be made from any suitable material conventionally used for surface contacts of smartcards, credit cards, telephone cards or similar and will usually be a copper alloy. By placing the ground contact 21 in such a position that any metal part of the reader will contact the ground contact 21 first, electrostatic voltages will be discharged and the risk of data loss on the card 20 by electrostatic discharge will be reduced.

The card memory device 20 according to the present invention provides an environmentally sealed memory card of several Mbytes of data (at least 1 MBytes) which may be carried on the person in the usual way like credit cards, e.g. it may be stored in wallets, handbags, coat pockets etc. without loss or corruption. The card memory device 20 in accordance with the present invention may find advantageous use as security cards for controlling the operation of personal computers, as any form of card storing personal data such as health insurance cards, data cards for vehicles, e.g. recording the mileage and driving times of commercial vehicles, as a card for storing computer programs, as a card for storing text documents such as books, etc.

What is claimed is:

1. A data storage device comprising:

connections forming an input/output means;

a microprocessor;

a plurality of memory units for storage of digital data, an addressing scheme for each memory location of a memory unit including a parallel and a serial portion; and a selecting device for selecting one of the memory units and for routing the address information and data to and/or from the selected memory unit, the microprocessor being interposed between the input/output means and the selecting device and the microprocessor being adapted for:

routing through all data and address information sent to and sent by the data storage device, and supplying address information which relates to the data sent to each selected memory unit;

wherein the selecting device has a plurality of first serial ports, one connected to each memory unit via a serial bus and the parallel address portion defines one of the first serial ports of the selecting device.

2. The data storage device according to claim 1, wherein a parallel port of the selecting device is connected to a parallel port of the microprocessor for receiving the parallel portion of a memory address.

3. The data storage device according to claim 1, wherein a second serial port of the selecting device is connected to a serial port of the microprocessor for receiving the serial portion of a memory address.

4. The data storage device according to claim 1, wherein the memory capacity is at least 1 Mbytes.

5. The data storage device according to claim 1, wherein the connections are a first set of surface contacts including a ground contact, a power source contact and a data input and/or output contact, and the first set corresponding to a second set of contacts in a reader, the ground contact of the first set being arranged to ground any contact of the second set before this reader contact makes contact with any of the power and/or data contacts.

6. The data storage device according to claim 5, wherein the ground contact surrounds the data contact on three sides.

7. The data storage device according to claim 1, wherein the microprocessor is a chip with read only memory on the chip.

8. The data storage device according to claim 7, wherein the microprocessor has on-chip random access memory.

9. The data storage device according to claim 7, wherein the microprocessor has on-chip non-volatile memory.

10. The data storage device according to claim 7, wherein the memory units are external to the microprocessor chip.

11. The data storage device according to claim 7, wherein the selecting device is external to the microprocessor chip.

12. The data storage device according to claim 1, the data storage device being flexible.

13. The data storage device according to claim 1, wherein the data storage device is a memory card device, the microprocessor, the plurality of memory units and the selecting device being embedded on the memory card device.

14. A method of suing a data storage device, the data storage device having connections forming an input/output means and a microprocessor and a plurality of memory units external to the microprocessor for storage of digital data, the method comprising:

selecting one of the memory units;

routing address information and data to and/or from the selected memory unit, an addressing scheme for each memory location of a memory unit including a parallel and a serial portion;

routing through the memory all data and address information sent to and sent by the data storage device; and supplying address information from the microprocessor relating to the data sent to each selected memory unit wherein the parallel address portion defines one of the memory units.

15. The method according to claim 14, wherein the supplying of address information from the microprocessor includes allocating a block of addresses.

16. The method according to claim 15, wherein the supplying of address information from the microprocessor includes allocating addresses in any memory unit pseudo-randomly.

17. The method according to claim 14, wherein the supplying of address information from the microprocessor includes allocating addresses in any memory unit pseudo-randomly.

* * * * *